United States Patent
Hsu et al.

(10) Patent No.: US 11,063,511 B1
(45) Date of Patent: Jul. 13, 2021

(54) VALLEY-FILL PFC CIRCUIT WITH EMI PROTECTION

(71) Applicant: Elite Semiconductor Memory Technology Inc., Hsinchu (TW)

(72) Inventors: Che-Wei Hsu, Hsinchu (TW); Wun-Long Yu, Hsinchu (TW)

(73) Assignee: ELITE SEMICONDUCTOR MEMORY TECHNOLOGY INC., Hsinchu (TW)

(*) Notice: Subject to any disclaimer, the term of this patent is extended or adjusted under 35 U.S.C. 154(b) by 0 days.

(21) Appl. No.: 16/735,633

(22) Filed: Jan. 6, 2020

(51) Int. Cl.
*H02M 1/42* (2007.01)
*H05B 45/3725* (2020.01)
*H05B 45/355* (2020.01)

(52) U.S. Cl.
CPC ........ *H02M 1/4266* (2013.01); *H05B 45/355* (2020.01); *H05B 45/3725* (2020.01)

(58) Field of Classification Search
CPC ............... H02M 1/4266; H05B 45/355; H05B 45/3725
See application file for complete search history.

(56) References Cited

U.S. PATENT DOCUMENTS

| 9,572,206 | B2 | 2/2017 | Kotowski |
| 2013/0026937 | A1* | 1/2013 | Nakajo ............. H05B 45/3725 315/207 |
| 2013/0207567 | A1 | 8/2013 | Mednik |
| 2014/0159608 | A1* | 6/2014 | Simi ..................... H05B 45/50 315/205 |

FOREIGN PATENT DOCUMENTS

| CN | 103762868 A | 4/2014 |
| CN | 104079185 A | 10/2014 |
| TW | M477112 U | 4/2014 |
| TW | 201838479 A | 10/2018 |

* cited by examiner

*Primary Examiner* — Jue Zhang
(74) *Attorney, Agent, or Firm* — Winston Hsu

(57) ABSTRACT

A power control circuit includes an alternating current (AC) power source, a rectifier and a valley-fill circuit. The AC power source is configured to receive an AC voltage. The rectifier is configured to convert the AC voltage into a rectified voltage. The valley-fill circuit includes: an inductor, having a first terminal coupled to the rectifier, and a second terminal; a first resistor, having a first terminal coupled to the second terminal of the inductor, and a second terminal; a diode, having a cathode coupled to the second terminal of the inductor, and an anode; and a first capacitor, having a first terminal coupled to the second terminal of the first resistor and the anode of the diode, and a second terminal coupled to ground.

9 Claims, 6 Drawing Sheets

VALLEY-FILL PFC CIRCUIT WITH EMI PROTECTION

BACKGROUND OF THE INVENTION

1. Field of the Invention

The present invention relates to a passive valley-fill power factor correction (PFC) architecture which converters the AC voltage to a DC voltage, and more particularly, to the improvement in electromagnetic interference (EMI) for switching mode power supply (SPMS) system.

2. Description of the Prior Art

Power factor is important for telling whether an electronic product works efficiently enough. Power factor can be calculated by comparing the real power with the apparent power. Real power is used to represent the effectiveness of work, and only includes the real component of the AC power, while apparent power, being the average product of current and voltage, includes both the real component and the imaginary component of the AC power.

In an electric power system with a lower power factor will consume more circulating current than that with a higher power factor for the same amount of useful power transferred due to the energy return in the load these higher current would increase in overall energy loss in the distribution system. In other words, low power factor means lower operating efficiency which leads to the need for an increased equipment capacity and for more conductors. According to ENERGY STAR Lamps V2.1 Final Specification, for an illumination product with total luminaire input power under 5 watts, the power factor thereof should exceed 0.5; and for an illumination product with total luminaire input power over 5 watts, the power factor thereof should exceed 0.7.

A valley-fill circuit is crucial in tuning the power factor of the product, and is a type of passive power factor correction (PFC) circuit. Please refer to FIG. 1A, which is a diagram illustrating a conventional PF control circuit 100. As shown in FIG. 1A, the PF control circuit 100 comprises an AC power source 10, a diode-bridge rectifier 15, an EMI module 20, a valley-fill circuit 30, a switching mode power supply (SMPS) 40 and an LED array 50. The EMI module 20 is coupled to the AC power source 10, and is configured to reduce the EMI emission. The valley-fill circuit 30 is coupled to the EMI module 20, and is configured to improve the power factor of the PF control circuit 100. However, there are many passive components is designed in PF control circuit 100 required both a valley-fill circuit 30 and a EMI module 20 to improve the power factor and EMI emission, respectively.

In addition, when the AC voltage is applied to PF control circuit 100 the rectified voltage is charged across the capacitors (i.e. the capacitors $C_{V1}$ and $C_{V2}$) via D2 and Rv until up to approximately half of peak line voltage, (see the charging directions indicated by the dotted arrows in FIG. 1A). When operating into valley phase means the line voltage falls below the peak voltage the $C_{V1}$ and $C_{V2}$ are discharged to load (see the discharging directions indicated by the dotted arrows in FIG. 1B). More specifically, the PF control circuit 100 charges in a serial manner, but discharges in a parallel manner. This results in asymmetry in current, which might cause higher total harmonic distortions (THD). As indicated above, a novel approach and architecture is invented for improving the overall power factor of a SMPS driver applicable to electronic devices such as illumination devices.

SUMMARY OF THE INVENTION

An embodiment of the present invention provides a power control circuit that comprises an alternating current (AC) power source, a rectifier and a valley-fill circuit. The AC power source is configured to receive an AC voltage. The rectifier is configured to convert the AC voltage into a rectified voltage. The valley-fill circuit comprises: an inductor, having a first terminal coupled to the rectifier, and a second terminal; a first resistor, having a first terminal coupled to the second terminal of the inductor, and a second terminal; a diode, having a cathode coupled to the second terminal of the inductor, and an anode; and a first capacitor, having a first terminal coupled to the second terminal of the first resistor and the anode of the diode, and a second terminal coupled to ground.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

The aforementioned related art solution (or other conventional solutions) reaches the desired power controlling ability by sacrificing in higher cost, complicated design complexity, more passive elements (which causes the circuit area to be larger), etc.

The embodiments of the present invention provide novel circuitry designs with reduced cost and complexity as follows.

Figure 2:
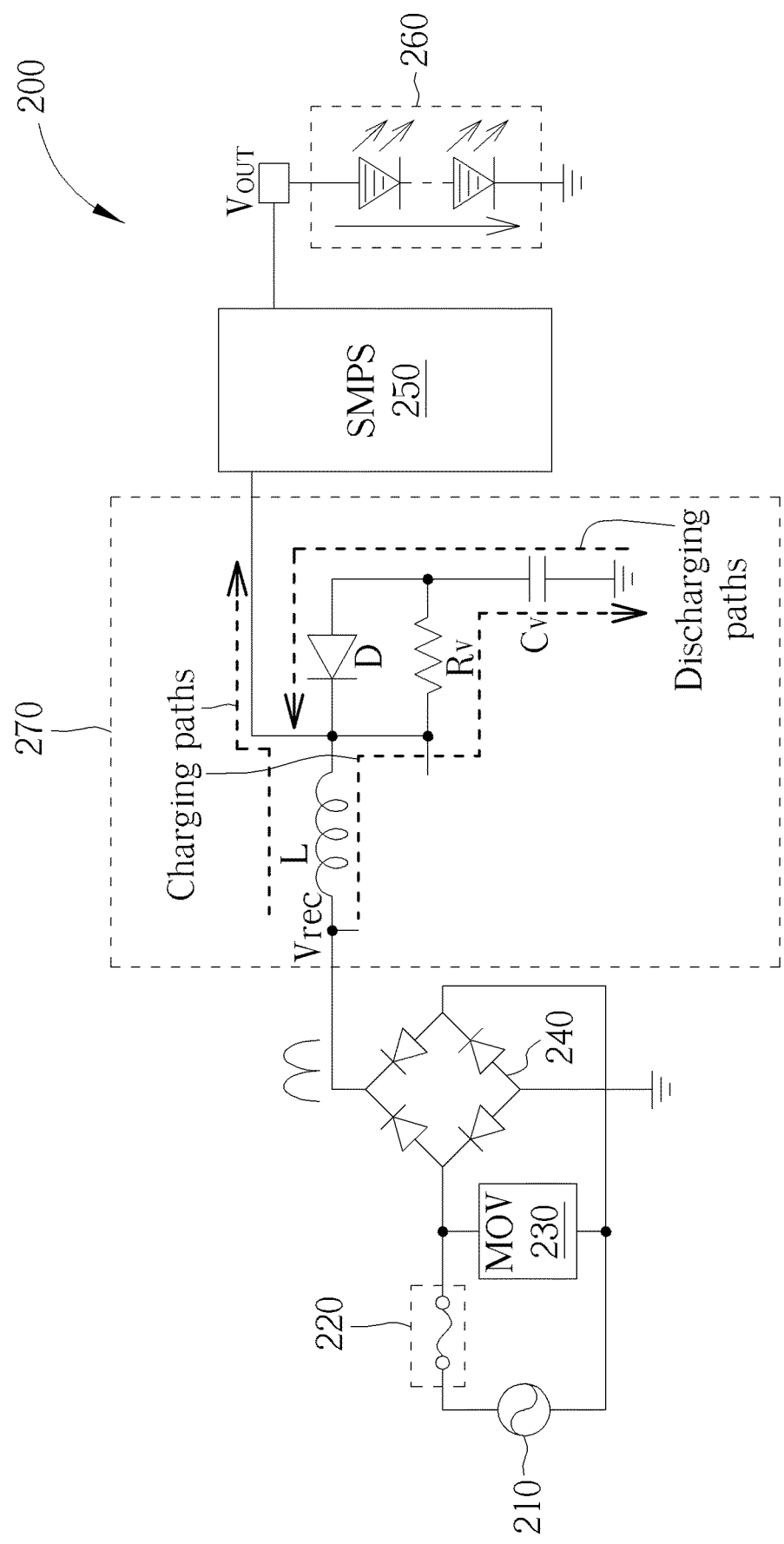
FIG. 2 is a diagram illustrating a PF control circuit according to an embodiment of the present invention.

Please refer to FIG. 2, which is a diagram illustrating a PF control circuit 200 according to an embodiment of the present invention. As shown in FIG. 2, the inductor L, diode D, resistor $R_V$ and the capacitor $C_V$ in FIG. 2 can be jointly viewed as an integrated EMI-Valley circuit (i.e. the valley-fill circuit 270) for eliminating the above disadvantages while an ideal technical effect can still be achieved. In addition to the valley-fill circuit 270, the PF control circuit 200 further comprises an AC current source 210, a fuse 220, a metal-oxide varistor (MOV) unit 230, a rectifying circuit 240, a switched-mode power supply (SMPS) 250 and an LED array 260. As long as same/similar technical effects can be achieved, some elements depicted in FIG. 2 can be omitted based on actual design requirements.

The MOV unit 230 is an electronic component with an electrical resistance that varies with the applied voltage. Also known as a voltage-dependent resistor (VDR), it has a nonlinear, non-ohmic current-voltage characteristics similar to those of a diode. In contrast to a diode, it has the same characteristic for both directions of traversing current. The MOV unit 230 can be used as a control or compensation element in the PF control circuit 200, either to provide optimal operating conditions or to protect against excessive transient voltages.

The a rectifying circuit 240 can be a diode-bridge rectifier (also called as bridge rectifier). For illustrative purposes, a diode-bridge rectifier is an arrangement of four (or more) diodes in a bridge circuit configuration that provides the same polarity of output for either polarity of input. It is widely applied for conversion of an alternating-current (AC) input into a direct-current (DC) output.

The SMPS 250 converts power using switching devices that are turned on and off at high frequencies, and storage components such as inductors or capacitors to supply power when the switching device is in its non-conduction state. The SMPS can be also used to power a wide variety of equipment such as computers, sensitive electronics, battery-operated devices and other equipment requiring high efficiency.

Figure 1A:
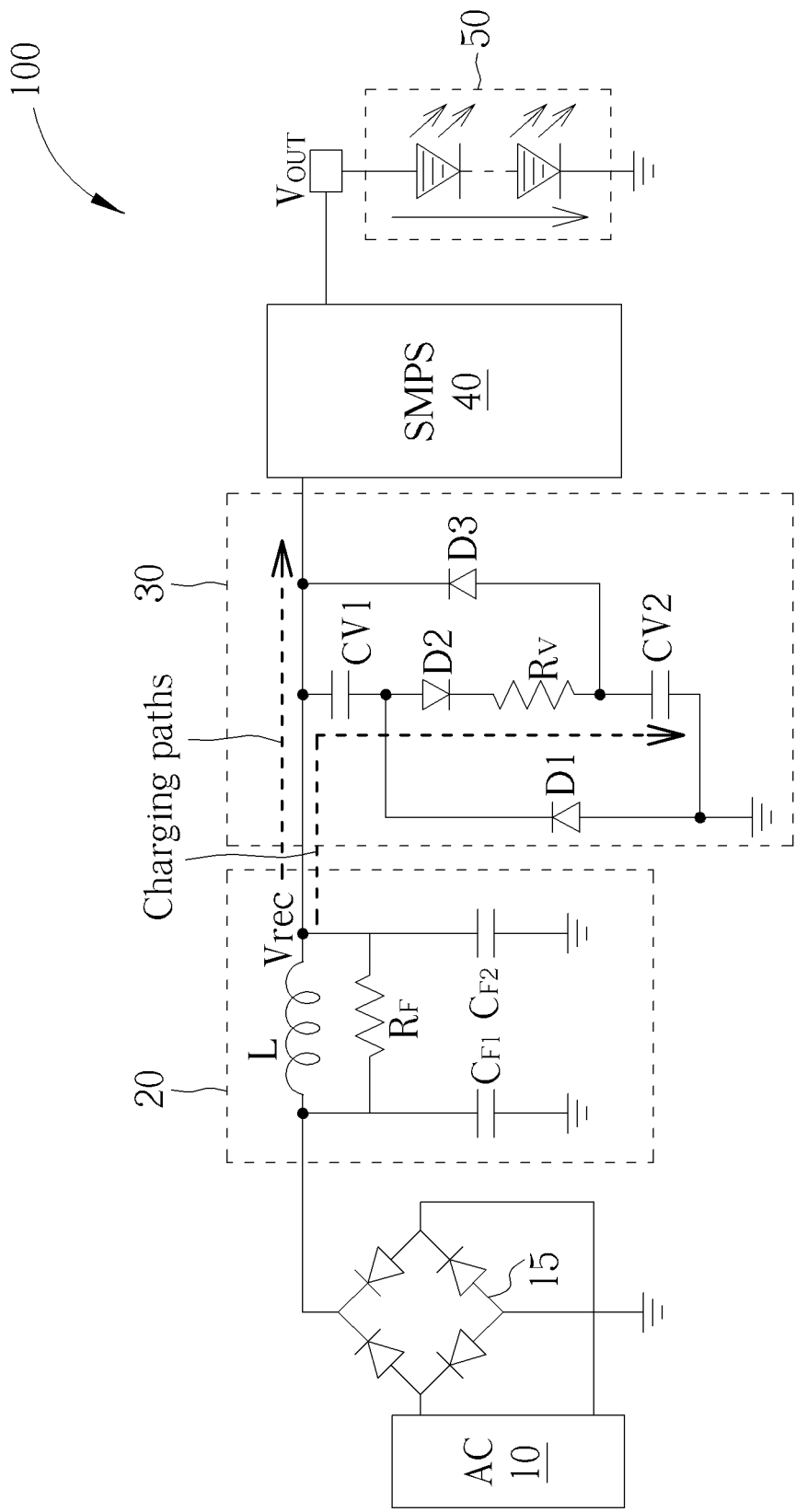
FIG. 1A is a diagram illustrating the charging operation of a conventional PF control circuit.
Figure 1B:
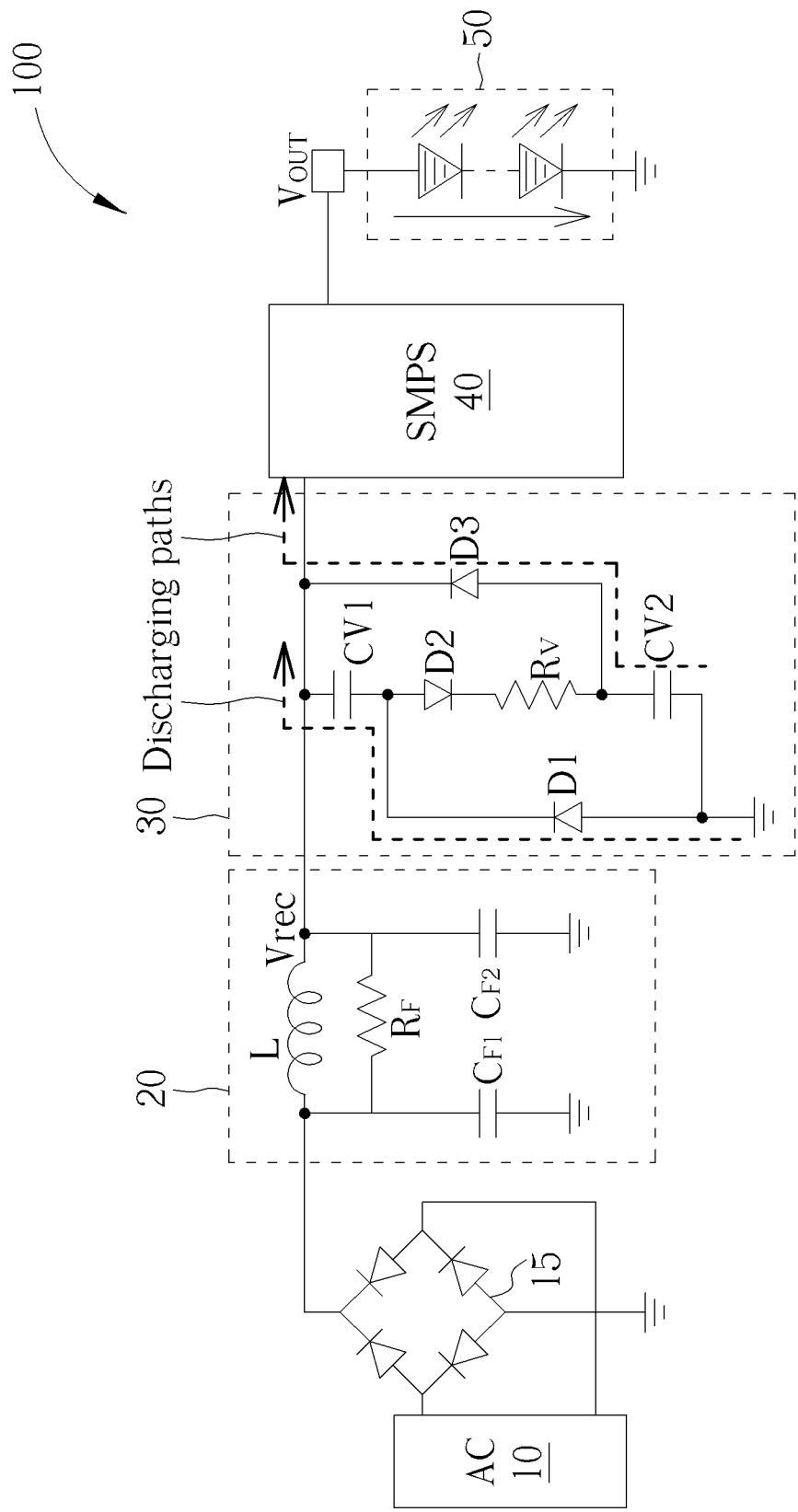
FIG. 1B is a diagram illustrating the discharging operation of the conventional PF control circuit shown in FIG. 1A.

Specifically, the configuration of the inductor L and the capacitor $C_V$ may provide the PF control circuit 200 with the EMI-suppressing ability, and the configuration of the diode D, the resistor $R_V$ and the capacitor $C_V$ may provide the PF control circuit 200 with the valley-filling ability, wherein the combination of the diode D, the resistor $R_V$ and the capacitor $C_V$ provides functions similar to the combination of the $R_V$, the capacitor $C_V$ and the diode D3 shown in FIG. 1. Compared with the charging/discharging manners shown in FIG. 1/FIG. 2), the charging/discharging manners may improve the symmetry performance, thereby solving the problems faced in related art techniques.

Figure 3:
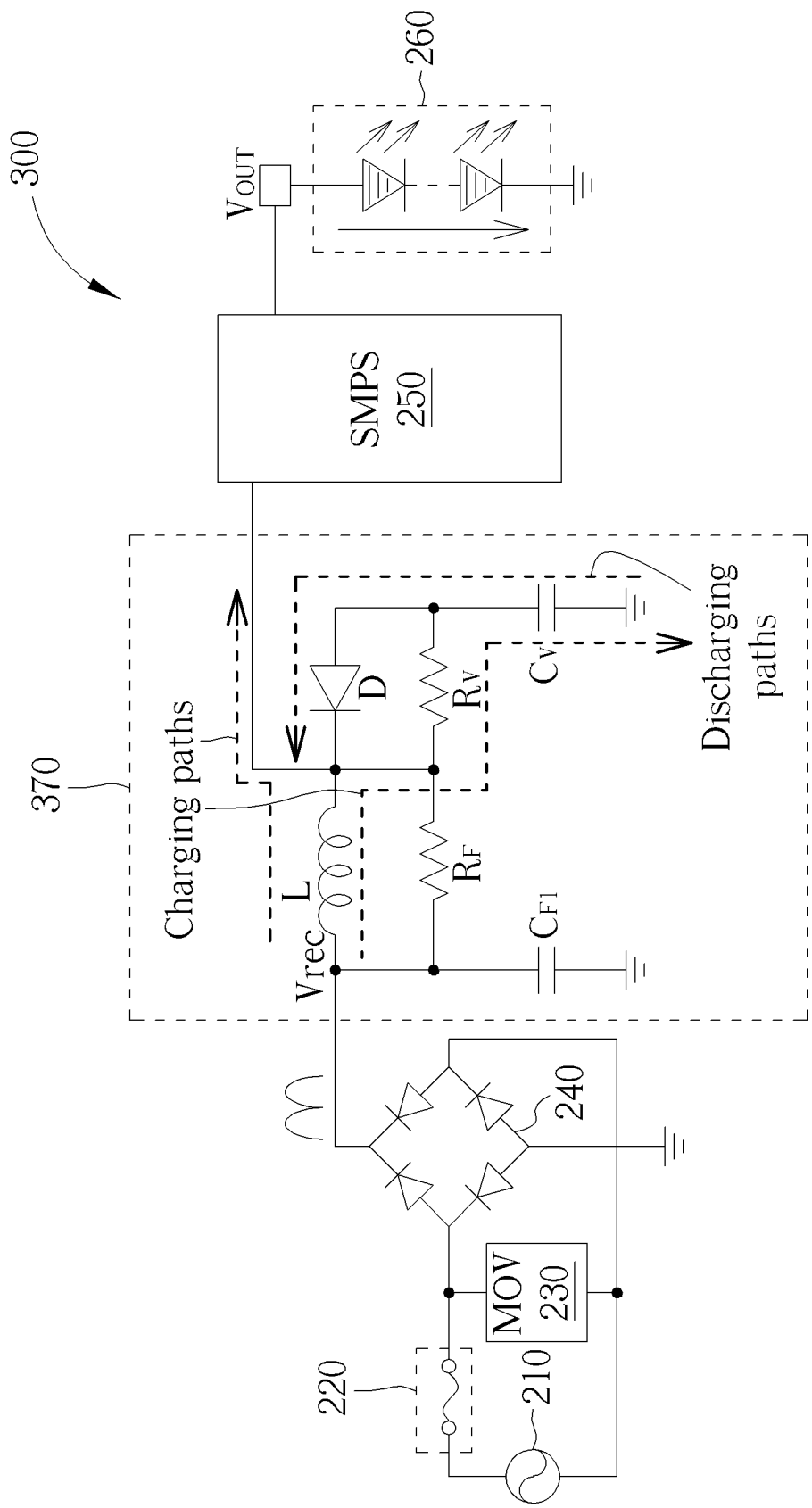
FIG. 3 is a diagram illustrating a PF control circuit according to another embodiment of the present invention.

Please refer to FIG. 3, which is a diagram illustrating a PF control circuit 300 according to another embodiment of the present invention. The difference between the PF control circuits 200 and 300 is that the valley-fill circuit 370 further comprises the resistor $R_F$ and the capacitor $C_{F1}$. The combination of the capacitor $C_{F1}$, the inductor L and the capacitor $C_V$ forms a n-shape EMI circuit, which may provide better EMI-suppressing characteristics.

Figure 4:
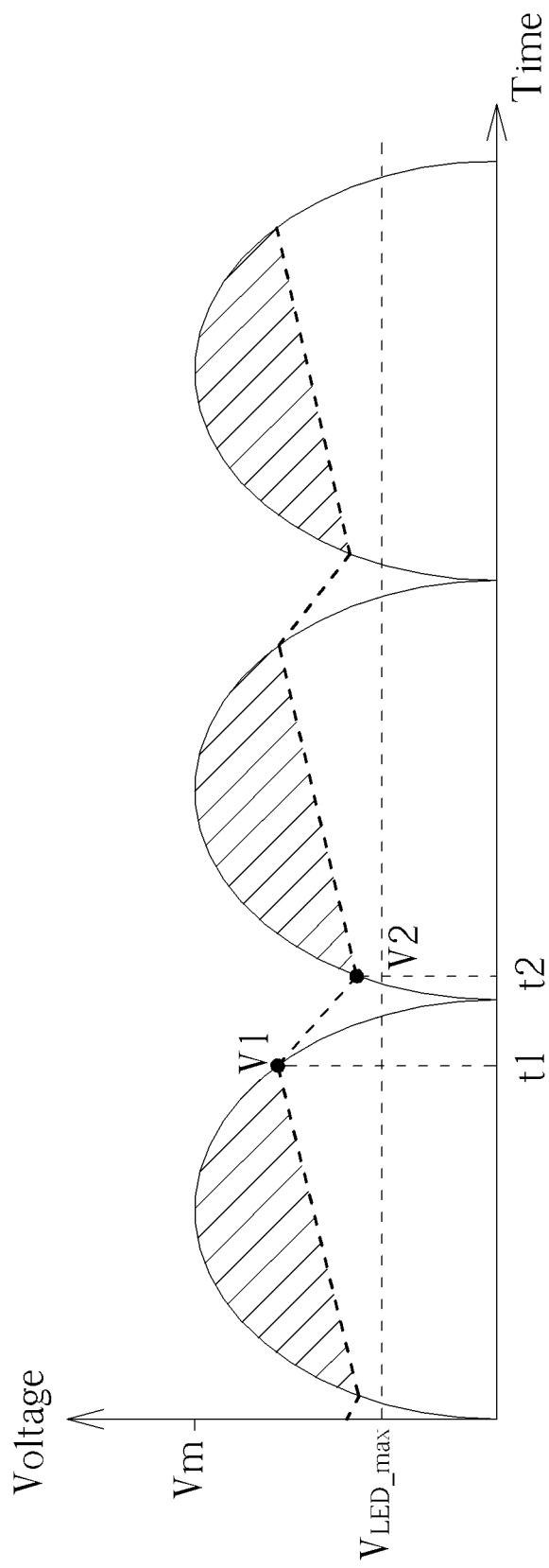
FIG. 4 is a diagram illustrating the output of the valley-fill circuit shown in FIG. 3.

To ensure the switched-mode power supply (SMPS) 250 receives the optimal input voltage, such as the rectified sinusoidal wave shown in FIG. 4 that outputted by the valley-fill circuit 370, the capacitance of the capacitor $C_V$ shall be specifically designed to meet certain conditions. Taking FIG. 4 as example, the dotted flat line denotes the voltage provided to the load of the LED array 260 with the magnitude being $V_{LED\_max}$. The ascending part of the dotted saw tooth line denotes the charging period, and the descending part of the dotted saw tooth line denotes the holding period. The constant (almost perfect) curve of $V_{LED\_max}$ attributes to the carefully designed value of $C_V$ (shown in Italics for representing the capacitance of the capacitor $C_V$), wherein the value of $C_V$ can be derived from following equations:

$$C_V \geq \frac{I_{Load,max} \times t_{Hold}}{\Delta V_c} \quad (1)$$

$$t_{Hold} = \frac{1}{2\pi f}\left(\sin^{-1}\frac{V_1}{V_{m,min}} + \sin^{-1}\frac{V_2}{V_{m,min}}\right) \quad (2)$$

$$\frac{1}{2f} - t_{Hold} = t_{chg} \quad (3)$$

$$I_{chg} = \frac{V_{m,min} - \Delta V_C}{R_V} \quad (4)$$

$$\Delta V_c = \frac{I_{chg} * t_{chg}}{C_V} \quad (5)$$

$$\frac{\Delta V_C}{V_{m,min}} = \frac{t_{chg}}{R_V C_V + t_{chg}} \quad (6)$$

$$\frac{\left(\frac{V_{m,min}}{\Delta V_c} - 1\right) t_{chg}}{C_V} \leq R_V \quad (7)$$

Please refer to equation 1 (hereinafter Eq. 1), $C_V$ must be larger than or equal to the given condition so that the LED array 260 can get the desired supply voltage, wherein $\Delta V_C$ represents the voltage variation of the capacitance $V_C$, $I_{load,max}$ represents the maximum current on the output load, $V_{m,min}$ represents the minimum of the peak value of the voltage amplitude $V_m$, and $t_{Hold}$ represents the capacitor discharging time which can be calculated through Eq. 2. In Eq. 3, the capacitor charging time $t_{chg}$ can be obtained by deducting $t_{Hold}$ from the cycle ½f. $I_{chg}$ is defined in Eq. 4, and the result in Eq. 6 can be easily deducted from Eq. 4 and Eq. 5. In addition, $I_{chg}$ represents the charging current, and $R_V$ represents the resistance of the resistor $R_V$. Finally, the result in Eq. 7 can be obtained by substituting Eq. 6 into Eq. 1.

Figure 5:
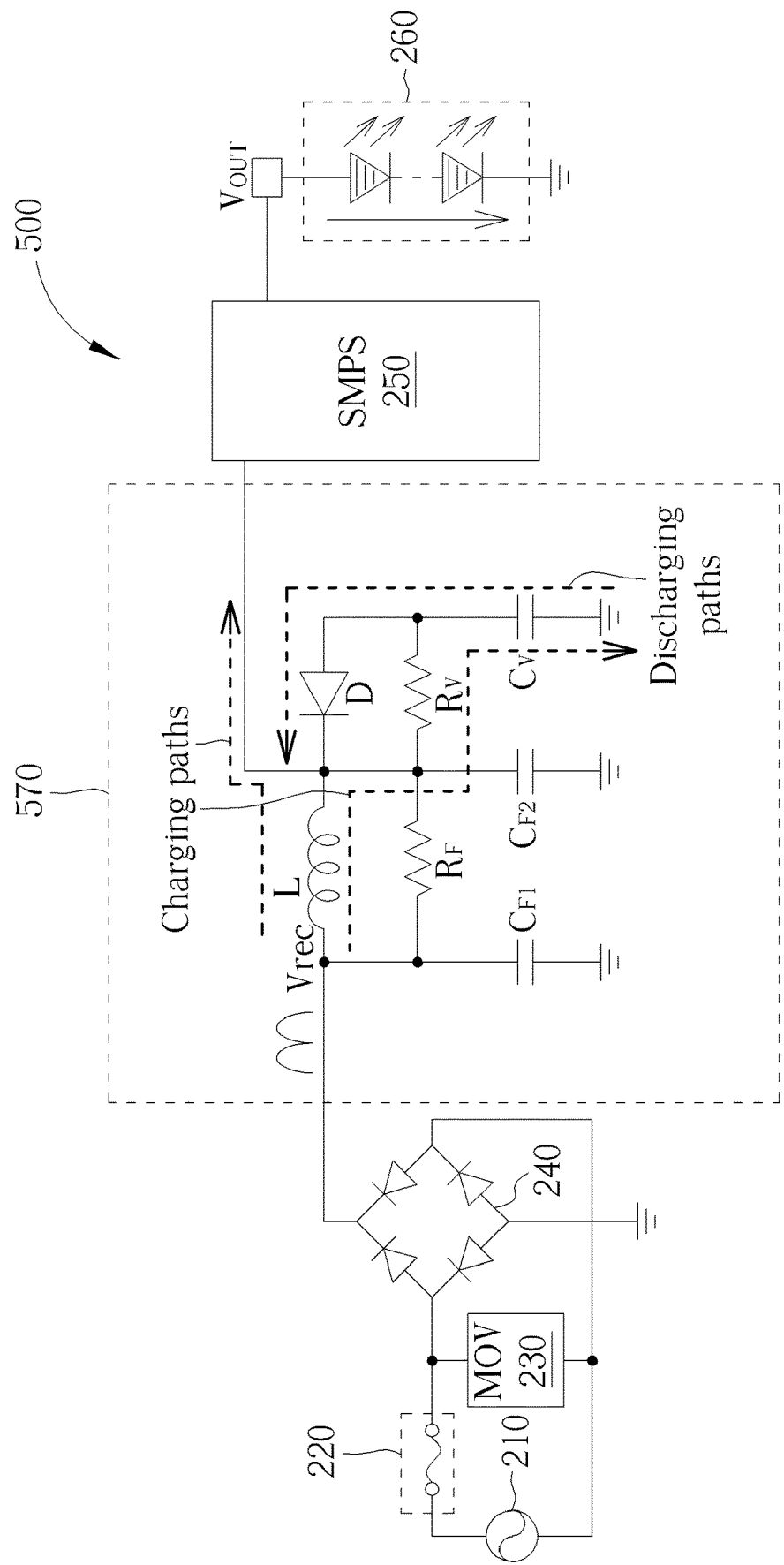
FIG. 5 is a diagram illustrating a PF control circuit according to yet another embodiment of the present invention.

FIG. 5 is a diagram illustrating a PF control circuit 500 according to yet another embodiment of the present invention. The difference between the PF control circuits 300 and 500 is that the valley-fill circuit 570 further comprises the capacitor $C_{F2}$, which also helps present an optimal output. Some elements in this embodiment are similar/identical to those in the previous embodiments, and detailed descriptions thereof are omitted here for brevity.

In view of the above, embodiments of the present invention are able to improve the overall power factor of a power control circuit and also provide EMI suppressing ability, with reduced overall cost and simplified design complexity. For example, embodiments of the present invention adopt integrated EMI-valley circuit design, which requires less elements (compared with related art solutions shown in FIGS. 1A and 1B) without sacrificing any required technical effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An power control circuit, comprising:
an alternating current (AC) power source, configured to receive an AC voltage;

a rectifier, configured to convert the AC voltage into a rectified voltage;
a valley-fill circuit, comprising:
  an inductor, having a first terminal coupled to the rectifier, and a second terminal;
  a first resistor, having a first terminal coupled to the second terminal of the inductor, and a second terminal;
  a diode, having a cathode coupled to the second terminal of the inductor, and an anode;
  a first capacitor, having a first terminal coupled to the second terminal of the first resistor and the anode of the diode, and a second terminal coupled to ground;
  a second resistor, having a first terminal coupled to the first terminal of the inductor, and a second terminal coupled to the first terminal of the first resistor; and
  a second capacitor, having a first terminal coupled to the first terminal of the second resistor, and a second terminal coupled to ground.

2. The power control circuit of claim 1, wherein the rectifier is a diode-bridge rectifier.

3. The power control circuit of claim 1, wherein the valley-fill circuit is further coupled to an DC-to-DC converter to provide a constant current or a constant voltage output for an LED driving circuit.

4. The power control circuit of claim 3, wherein a switched-mode power supply (SMPS) is coupled between the valley-fill circuit and the LED driving circuit.

5. The power control circuit of claim 1, further comprising:
  a metal-oxide varistor (MOV) unit, coupled between the AC power source and the rectifier; and
  a fuse 220, coupled between the AC power source and the MOV unit.

6. The power control circuit of claim 1, wherein the valley-fill circuit further comprises:
  a third capacitor, having a first terminal coupled to the first terminal of the first resistor, and a second terminal coupled to ground.

7. The power control circuit of claim 1, wherein the output of the valley-fill circuit is in form of a rectified sinusoidal wave.

8. The power control circuit of claim 1, wherein the first capacitor is charged through the inductor and the first resistor, and the first capacitor is discharged through the diode.

9. An power control circuit, comprising:
  an alternating current (AC) power source, configured to receive an AC voltage;
  a rectifier, configured to convert the AC voltage into a rectified voltage;
  a valley-fill circuit, comprising:
    an inductor, having a first terminal coupled to the rectifier, and a second terminal;
    a first resistor, having a first terminal coupled to the second terminal of the inductor, and a second terminal;
    a diode, having a cathode coupled to the second terminal of the inductor, and an anode; and
    a first capacitor, having a first terminal coupled to the second terminal of the first resistor and the anode of the diode, and a second terminal coupled to ground;
  wherein the output of the valley-fill circuit is in form of a rectified sinusoidal wave, and the capacitance of the first capacitor meets following equations:

$$C_V \geq \frac{I_{Load,max} \times t_{Hold}}{\Delta V_C};$$

$$t_{Hold} = \frac{1}{2\pi f}\left(\sin^{-1}\frac{V_1}{V_{m,min}} + \sin^{-1}\frac{V_2}{V_{m,min}}\right);$$

$$\frac{1}{2f} - t_{Hold} = t_{chg};$$

$$I_{chg} = \frac{V_{m,min} - \Delta V_C}{R_V};$$

$$\Delta V_c = \frac{I_{chg} * t_{chg}}{C_V};$$

$$\frac{\Delta V_C}{V_{m,min}} = \frac{t_{chg}}{R_V C_V + t_{chg}};$$

$$\frac{\left(\frac{V_{m,min}}{\Delta V_c} - 1\right)t_{chg}}{C_V} \leq R_V;$$

wherein $C_V$ represents the capacitance of the first capacitor, $\Delta V_C$ represents the voltage variation of the capacitance $V_C$, $I_{load,max}$ represents the maximum current on the output load, ½f represents a cycle of the rectified sinusoidal wave, $V_1$ represents an initial level of the rectified sinusoidal wave during a capacitor discharging time, $V_2$ represents a final level of the rectified sinusoidal wave during the capacitor discharging time, $V_{m,min}$ represents the minimum of the peak value of the voltage amplitude $V_m$, $t_{Hold}$ represents the capacitor discharging time, $t_{chg}$ represents the capacitor charging time, $I_{chg}$ represents the charging current, and $R_V$ represents the resistance of the first resistor.

* * * * *